(12) United States Patent
Zarro et al.

(10) Patent No.: US 11,432,563 B2
(45) Date of Patent: Sep. 6, 2022

(54) METHODS OF MAKING SUGAR CONE SPHERES

(71) Applicants: John Joseph Zarro, Nutley, NJ (US); Michael John Adams, Terrell, NC (US)

(72) Inventors: John Joseph Zarro, Nutley, NJ (US); Michael John Adams, Terrell, NC (US)

(*) Notice: Subject to any disclaimer, the term of this patent is extended or adjusted under 35 U.S.C. 154(b) by 0 days.

(21) Appl. No.: 16/666,072

(22) Filed: Oct. 28, 2019

(65) Prior Publication Data

US 2020/0128853 A1    Apr. 30, 2020

Related U.S. Application Data

(60) Provisional application No. 62/750,877, filed on Oct. 26, 2018.

(51) Int. Cl.
| | |
|---|---|
| *A23G 9/48* | (2006.01) |
| *A21D 13/36* | (2017.01) |
| *A23G 9/42* | (2006.01) |
| *A23G 1/30* | (2006.01) |

(52) U.S. Cl.
CPC ............. *A23G 9/485* (2013.01); *A21D 13/36* (2017.01); *A23G 1/305* (2013.01); *A23G 9/42* (2013.01); *A23V 2002/00* (2013.01)

(58) Field of Classification Search
None
See application file for complete search history.

(56) References Cited

U.S. PATENT DOCUMENTS

| | | | | |
|---|---|---|---|---|
| 4,812,323 | A | * 3/1989 | Savage | .................. A21D 13/33 249/122 |
| 5,352,470 | A | 10/1994 | Yang | |
| 6,153,243 | A | 11/2000 | Rosso | |
| 7,638,740 | B1 * | 12/2009 | Hradecky | ............ A47J 37/0611 219/520 |

(Continued)

OTHER PUBLICATIONS

Written Opinion, dated Jan. 10, 2020, for corresponding PCT Application No. PCT/US2019/058360, International Filing Date Oct. 28, 2019, consisting of 6 pages.

(Continued)

*Primary Examiner* — Lien T Tran
(74) *Attorney, Agent, or Firm* — Gearhart Law LLC; David Postolski

(57) ABSTRACT

A method of making sugar cone spheres is disclosed having an interior of an edible filling such as ice cream or frozen yoghurt encapsulated by a wafer. The method includes: baking a wafer dough mix on a heated waffle iron to produce a wafer, shaping the wafer into a shape by placing the wafer between an outer mold and an inner half mold and pressing the outer mold against the inner mold, cutting the wafer at a perimeter of the shape to produce a half-molded wafer shell, adding an edible filling to a cavity of the half-molded wafer shell, adding another edible filling to a cavity of another half-molded wafer shell, joining a perimeter of the half-molded wafer shell and a perimeter of the other half-molded wafer shell, and freezing the half-molded wafer shell and the other half-molded wafer shell together to produce a bite-size edible treat.

18 Claims, 9 Drawing Sheets

(56) References Cited

U.S. PATENT DOCUMENTS

| | | | |
|---|---|---|---|
| 2003/0203077 A1* | 10/2003 | Charles | A23G 9/286 |
| | | | 426/100 |
| 2004/0137123 A1 | 7/2004 | Mansuino | |
| 2008/0095898 A1 | 4/2008 | Mansuino | |
| 2014/0113035 A1 | 4/2014 | Bartkowska et al. | |
| 2015/0072047 A1* | 3/2015 | Harris | A21D 13/24 |
| | | | 426/76 |
| 2016/0029658 A1 | 2/2016 | Segawa et al. | |

OTHER PUBLICATIONS

International Search Report, dated Jan. 10, 2020, for corresponding PCT Application No. PCT/US2019/058360, International Filing Date Oct. 28, 2019, consisting of 3 pages.

* cited by examiner

METHODS OF MAKING SUGAR CONE SPHERES

PRIORITY CLAIM

This application is a United States utility application having priority to U.S. provisional application Ser. No. 62/750,877, filed Oct. 26, 2018 entitled METHODS OF MAKING SUGAR CONE SPHERES, the entirety of which is hereby incorporated by reference as if fully set forth herein.

FIELD OF THE EMBODIMENTS

This invention relates to methods of making bite-size sugar cone spheres containing a frozen dessert.

BACKGROUND OF THE EMBODIMENTS

A favorite food of adults and children alike during the summer months is undoubtedly ice cream in a waffle cone. On hot days, the ice cream or especially frozen yoghurt can melt rapidly spoiling clothes and causing a mess. The size of ice cream cones is also inconvenient to handle.

There is a need for methods of making ice cream treats that are easier to consume.

Examples of related art are summarized below.

U.S. Pat. No. 4,209,536 describes a substantially spherical filled food product comprising an outer closed shell of pastry enclosing a soft filling. The shell is seamless and consists of an oven-baked yeastless pastry having a humidity content not exceeding 1 wt. %. The shell has a coarse-cellular inner structure, with the cell size decreasing towards the exposed outer surface of the shell, said outer surface being substantially impervious to air and humidity. No yeast is used in the dough for the shell; the cellular structure-building aid in the dough is the white of egg. The outer diameter of the shell is from 10 mm to 20 mm, while the weight ratio of the filling to the shell is at least 2:1. The product is buoyant in comestible aqueous liquids such as fruit juice or milk.

U.S. Pat. No. 7,404,978 describes a wafer half-shell which has a mouth delimited by at least one annular surface and one or more side walls, in which the mouth surface and the surfaces of the side wall have a substantially smooth surface finish. Preferably the outer surface of the side wall has a porous, continuous or discontinuous region which extends peripherally and is receded relative to the mouth surface of the half-shell, resulting from the cutting of a radial wall connected to the side wall of the half-shell in a receded position relative to the annular surface defining the mouth of the half-shell. The annular coupling surfaces of the complementary half-shells have preferably centering means which are complementary each other. The half-shell is useful particularly for the production of a food product comprising a pair of half-shells fitted together mouth to mouth and including a mass of liquid filling.

European Patent No. 614614 describes a method of joining lines of adhesive alimentary material such as chocolate on products such as hemispherical wafer half-shells, the respective opening portions of which are to be joined together. For this purpose, the adhesive material is applied to a transfer surface in the form of a substantially continuous layer or in the form of piping of a shape representing the shape of the joining line to be formed. The opening portions of the products are then dipped in the continuous layer or piping of adhesive alimentary material.

U.S. Pat. No. 4,430,351 pertains to a confectionery product comprising a shell formed by two wafer shell halves jointly enclosing a filling. The filling has a water content not tolerable by the shell of wafer and is contained in a water-impermeable capsule of edible material, lining or bonded to the internal surface of the shell.

None of the art described above addresses all of the issues that the present invention addresses. The method of making a sugar cone sphere disclosed herein includes molding half spherical wafers, filling them with ice cream or frozen yoghurt, joining two of them at their midline and freezing them together to produce a bite-size sugar cone sphere.

SUMMARY OF THE EMBODIMENTS

The present disclosure relates to methods of making bite-size sugar cone spheres containing ice cream or frozen yoghurt encapsulated by a spherical wafer that prevents spillage of the ice cream if it melts.

In a first aspect, a method for producing a bite-size edible treat enclosed within a wafer shell is disclosed comprising: baking a wafer dough mix on a heated waffle iron to produce a wafer; shaping the wafer with a mold having a bilateral symmetry at its midline; cutting the wafer at the midline of the mold to produce a half-molded shell; adding an edible filling to the cavity of the half-molded shell; joining the two filled half-molded shells at the midline, and freezing together to produce a bite-size edible treat enclosed within a wafer shell.

In certain embodiments of the first aspect, a sugar cone connector is placed at the interface between the two filled half-molded shells.

In certain embodiments of the first aspect, the edible treat comprises a frozen dessert selected from the group consisting of ice cream and frozen yoghurt.

In certain embodiments of the first aspect, the frozen dessert further comprises chocolate chips or fragments of fruit or candy.

In certain embodiments of the first aspect, the interior and/or exterior surface of each half-molded shell is coated in molten chocolate.

In certain embodiments of the first aspect, the frozen dessert has a single flavor. In certain embodiments, the frozen dessert has two or more different flavors.

In certain embodiments of the first aspect, the mold can have a spherical, a triangular shape or cube-like shape. In certain embodiments, the wafer can have a pattern.

In a second aspect, a method for producing a bite-size ice cream sugar cone sphere is disclosed comprising baking a wafer dough mix on a heated waffle iron to produce a wafer, shaping the wafer over a spherical mold having a bilateral symmetry at its midline, cutting the wafer at the midline to produce a half-spherical shell, filling the half-spherical shell with ice cream, joining two half-spherical shells at the midline, and freezing together to produce the bite-size ice cream sugar cone sphere.

In certain embodiments of the second aspect, a sugar cone connector is placed at the interface between the two filled half-molded shells.

In certain embodiments of the second aspect, the interior and/or exterior of the half-spherical shell is coated with chocolate.

In certain embodiments of the second aspect, the ice cream consists of a single flavor.

In certain embodiments of the second aspect, the ice cream comprises two or more different flavors.

In certain embodiments of the second aspect, the ice cream comprises candy, chocolate chips or fragments of fruit.

It is an object of the disclosure to provide methods of making sugar cone spheres having an interior of ice cream or frozen yoghurt that is encapsulated by a continuous waffle wafer where the sugar cone spheres are made by joining and freezing together two half waffle spheres filled with ice cream.

BRIEF DESCRIPTION OF THE DRAWINGS

FIG. 5 shows an exemplary views of a cylindrical shape cutter.

DESCRIPTION OF THE PREFERRED EMBODIMENTS

Figure 1:
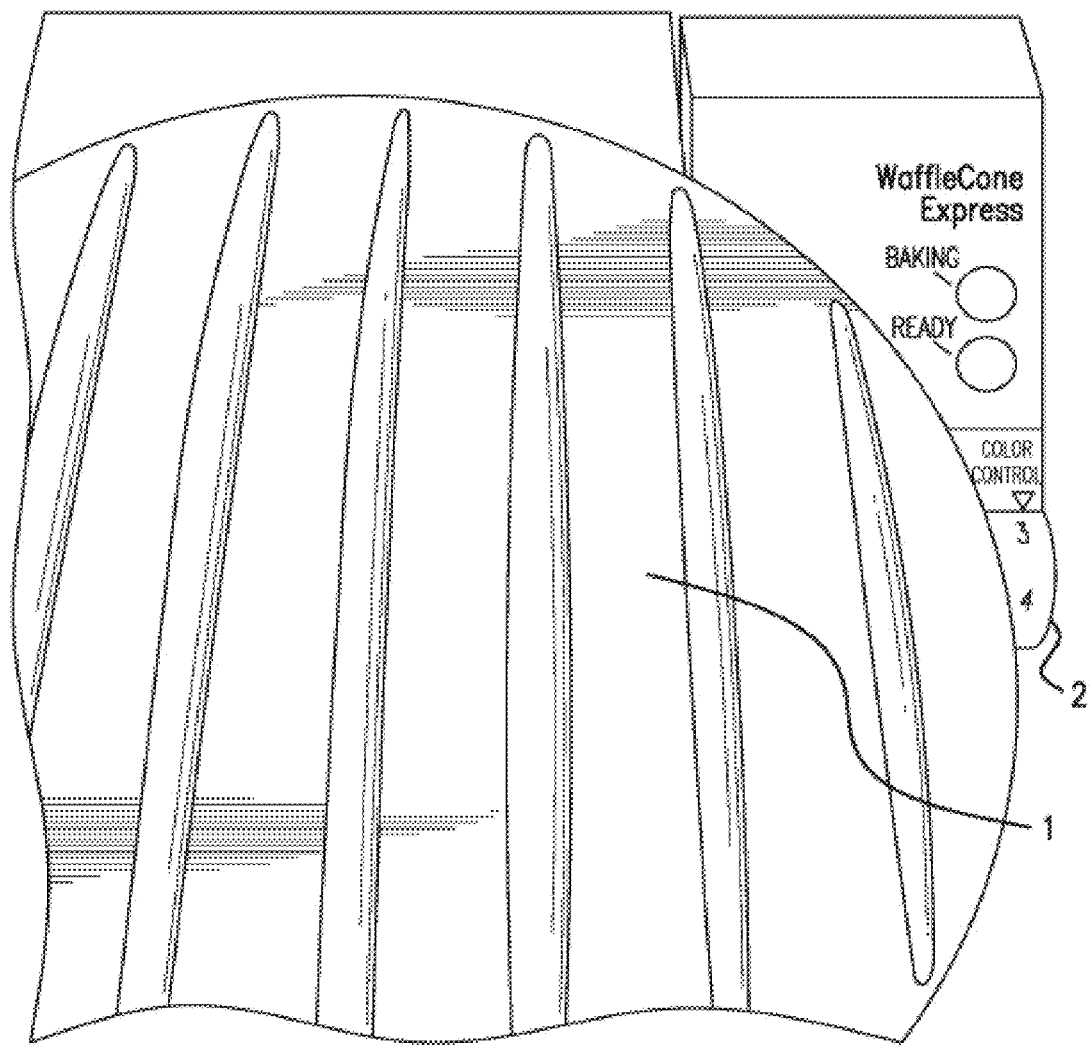
FIG. 1 depicts an exemplary top perspective view of a waffle baking machine with temperature/color control and indicator lights showing when the wafer dough mix is baking and when baking is complete.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
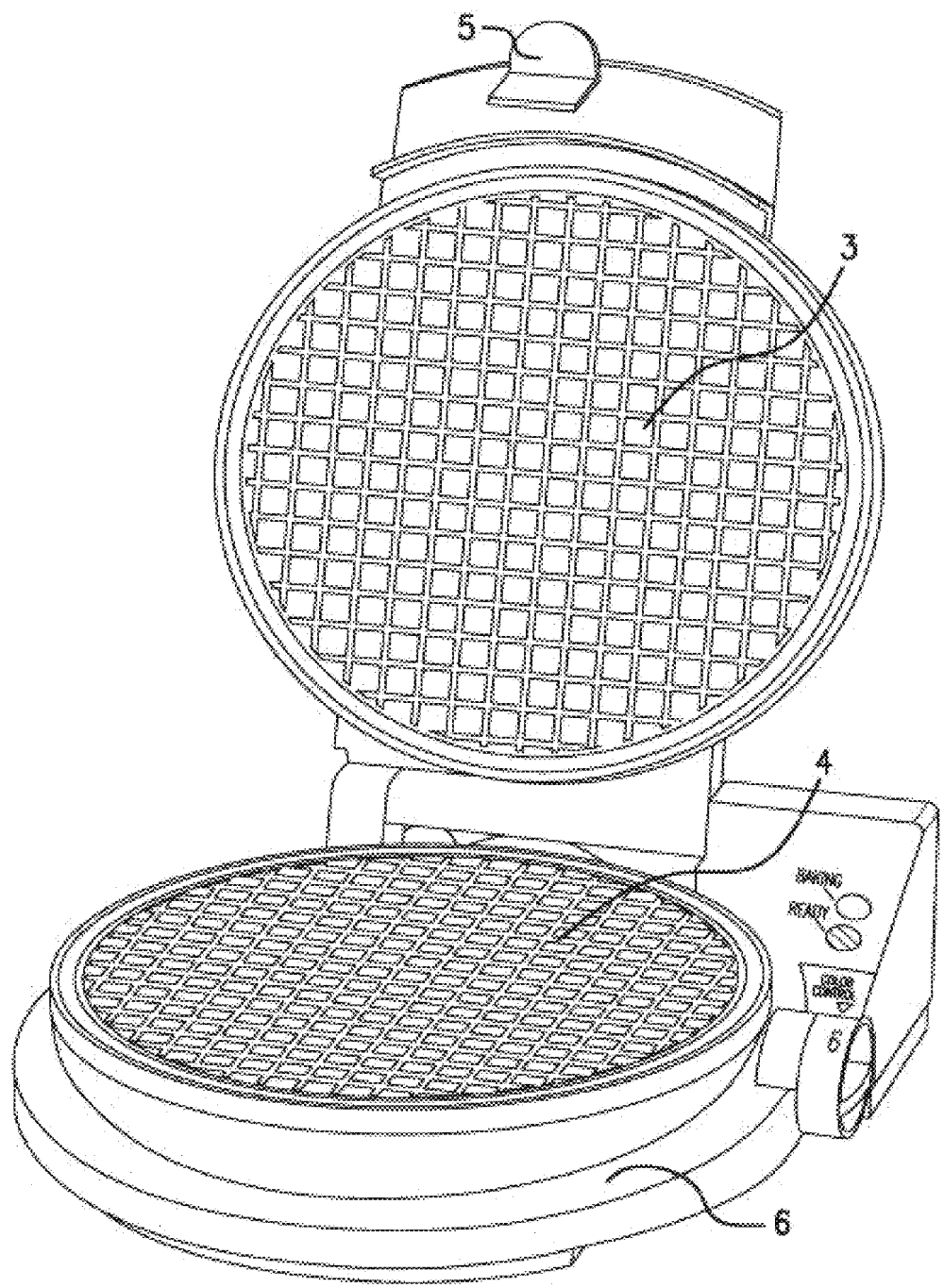
FIG. 2 shows an exemplary perspective view of the waffle baking machine having a hinge connected top and bottom heated waffle iron.
Figure 3:
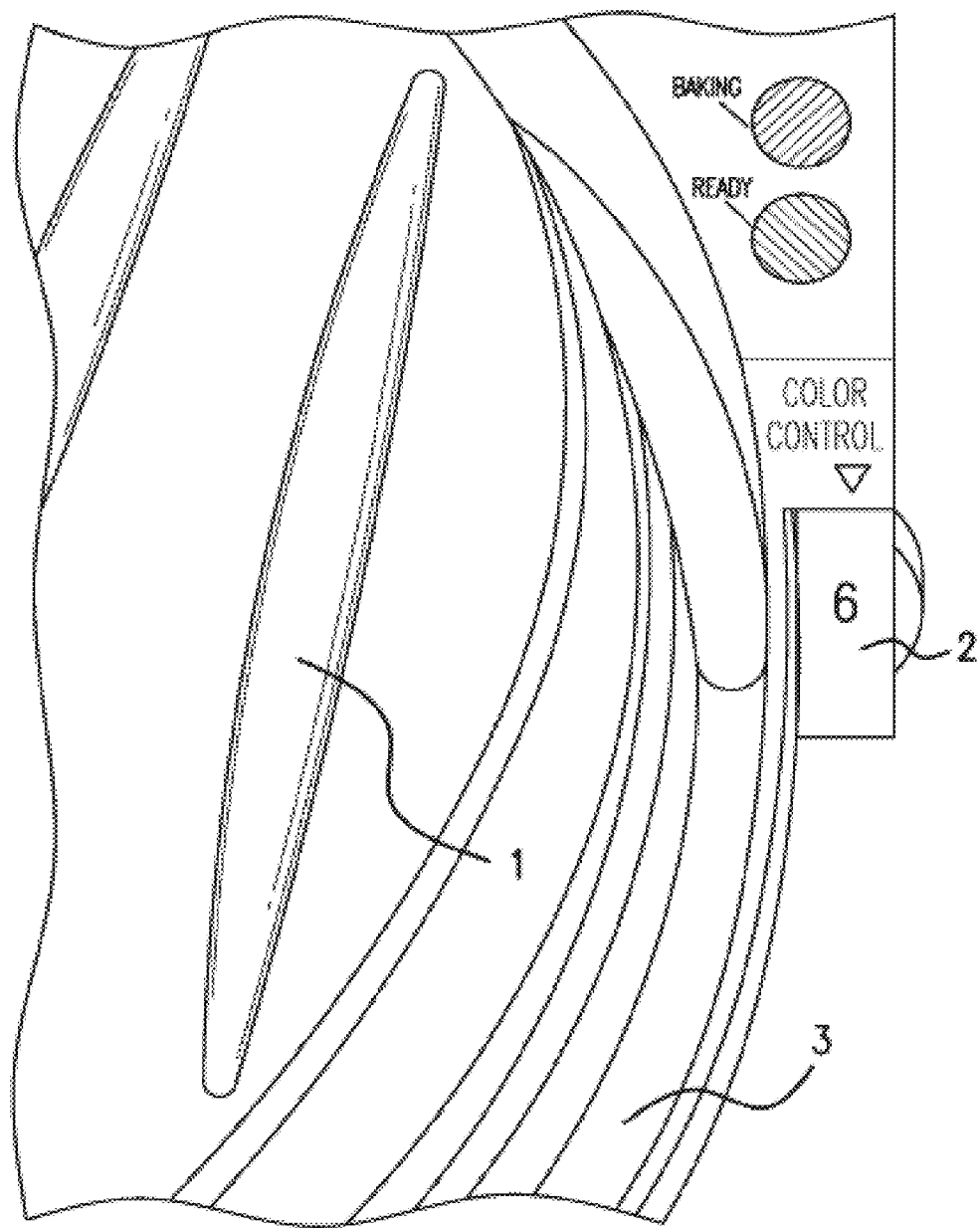
FIG. 3 shows an exemplary top perspective view with the top waffle iron place on the bottom waffle iron.

FIGS. 1-3 disclose an exemplary depiction of an electric WaffleCone baking machine.

FIG. 1 shows the top of the upper waffle iron 1 and a color control 2 that regulates the baking temperature. The LED light "READY" signals when the upper and lower waffle iron has reached an appropriate temperature. The LED light "BAKING" indicates when baking of the wafer dough mix is in progress.

FIG. 2 depicts the WaffleCone baking machine with a handle 5, a hinge-connected heated upper waffle iron 3 and lower waffle iron 4 and a base 6.

As shown in FIG. 3, the upper and lower waffle irons (3, 4) are opposite to each other when closed. The waffle iron can have a grid pattern that is rectilinear with the pattern lines running dominantly from the front of the waffle maker to the rear as well as from left to right. The wafer dough mix is spread evenly across the waffle plates. Generally the mix is introduced manually onto the center of the lower heater waffle plate and is then spread out between the upper and lower plates as the upper plate is lowered into contact with the lower plate. The wafer is baked until the consistency of the wafer is still soft.

In certain embodiments, the wafer can be about 0.1, 0.2, 0.3, 0.4 or 0.5 inches thick.

Figure 4:
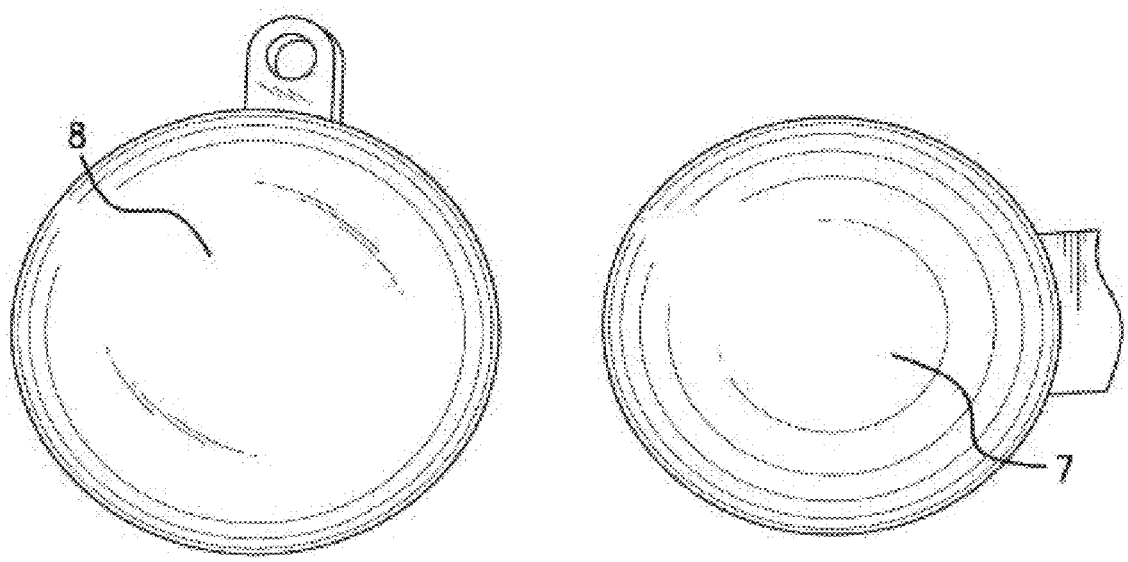
FIG. 4 shows an exemplary top perspective view ½ spherical molds.

As shown in FIGS. 4-5, the wafer 11 can be shaped into a ½ spherical shape 9 by placing the wafer between and pressing an outer ½ spherical mold 8 against an inner ½ spherical mold 7 to produce a ½ spherical shape 9. The diameter of the outer ½ spherical mold can be about 0.1, 0.2, 0.3 inches greater than the inner ½ spherical mold to allow for the placement of the outer mold on to the inner mold. In certain embodiments, the ½ spherical shape 9 can have a diameter of about ½, about 1, about 1.5, or about 2 inches. The ½ spherical shape 9 is then cut at the midline 12 using a cylindrical cutter that can be placed over the ½ spherical shape 9 (see FIGS. 5A-5D).

Figure 5A:
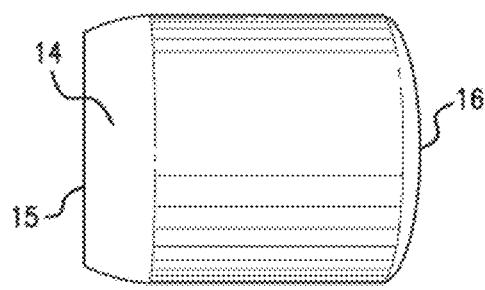
FIGS. 5A and 5B show a side view and top view of an outer cylinder respectively.
Figure 5B:
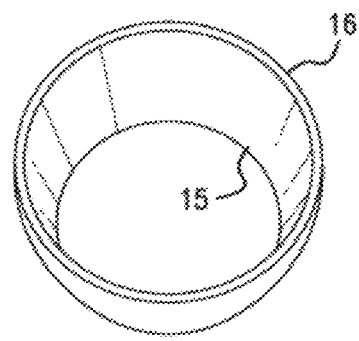
Figure 5C:
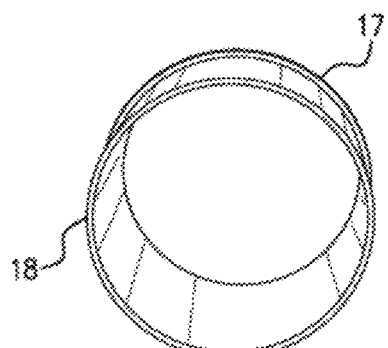
FIGS. 5C and 5D show top view and side view of the inner cylinder.
Figure 5D:
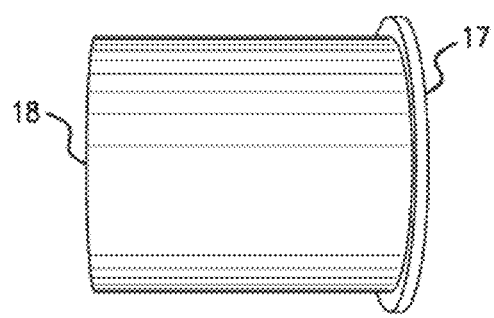
Figure 5E:
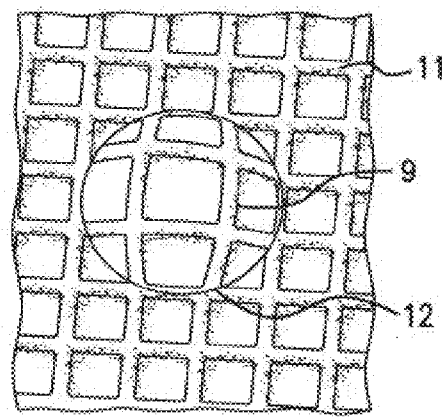
FIG. 5E depicts a piece of the waffle wafer after molding into a semi-spherical shape.
Figure 5F:
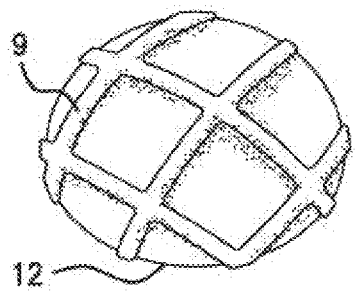
FIG. 5F depicts a semi-spherical waffle wafer shell after being cut at the midline by the cylindrical shape cutter shown in FIGS. 5A-D.
Figure 6:
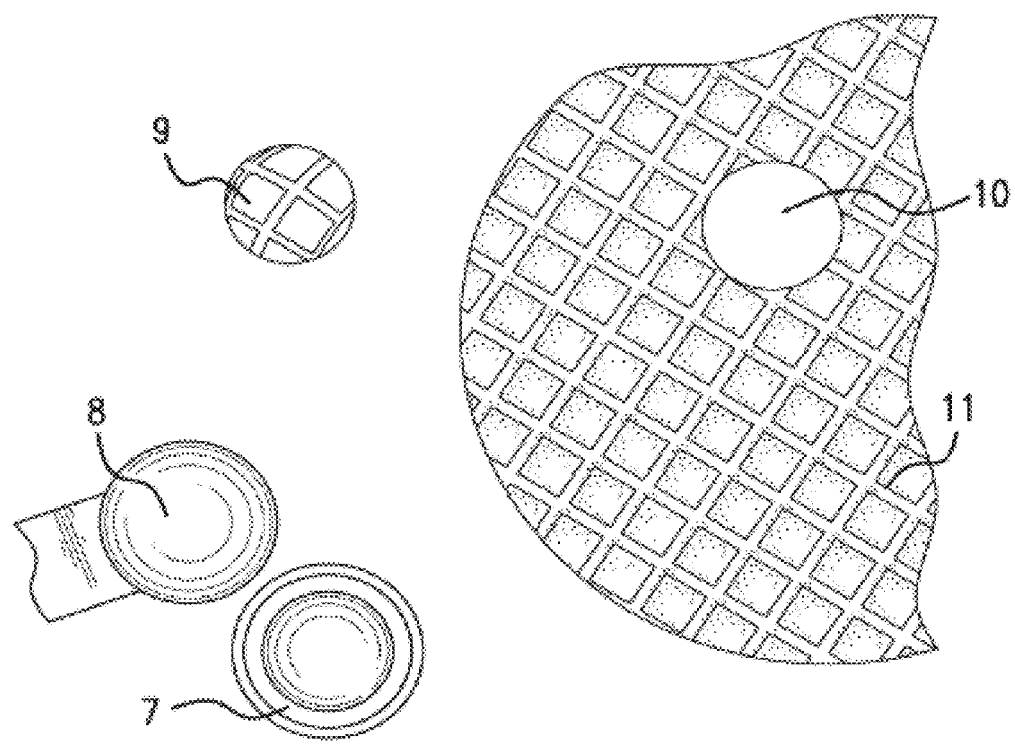
FIG. 6 shows a exemplary schematic and picture of a baked wafer with a circular cut out, an upper and lower ½ spherical mold and a half-spherical wafer shell.

The cylindrical cutter has an outer cylindrical shell depicted in FIGS. 5A-5B with a circular bottom 15, an inwardly sloped spacer 14 and a circular top 16 and an inner cylindrical shell depicted in FIGS. 5C-5D that has a circular top 17 and a sharp circular bottom 18. In a preferred embodiment, the inner cylindrical shell has a diameter that approximates the diameter of the ½ spherical shape 9. The diameter of the outer cylindrical shell can be about 0.1, 0.2, 0.3 inches greater than the inner cylindrical shell so as to allow for the movement of the inner cylinder within the outer cylinder. The circular aperture at the bottom 15 of the outer cylinder is then placed over the ½ spherical shape 9 attached to the wafer 11 (see FIG. 5E). The circular bottom 18 of the inner cylindrical shell is placed inside the outer cylinder through the aperture at the top of the outer cylindrical shell 16 and pressure is applied to the circular top 17 to cut out the periphery of the ½ spherical shape 9 at the midline 12 (see FIG. 5F). FIG. 6 depicts the circular cut out 10 of the wafer, the ½ spherical shape 9 and the an outer mold 8 and an inner mold 7.

Figure 7:
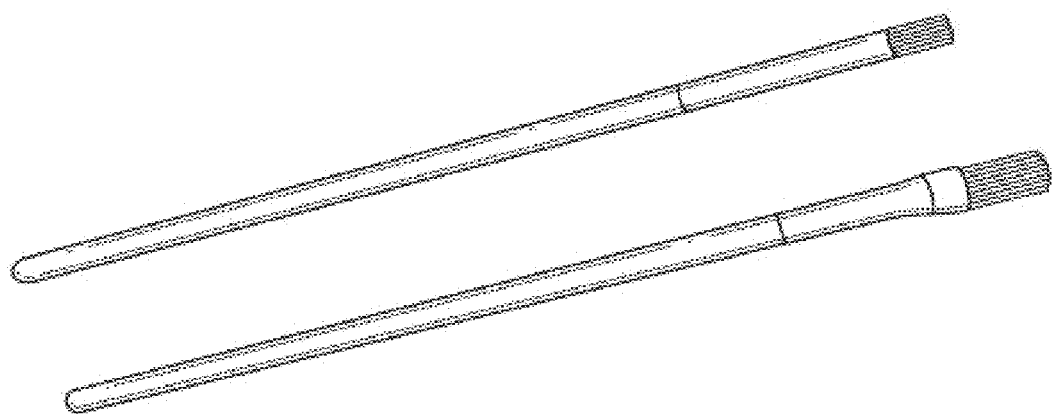
FIG. 7 shows an exemplary perspective view of brushes used to coat molten chocolate on to the half-spherical wafer shell.

FIG. 7 depicts brushes that may be used to apply molten chocolated to the interior and/or exterior surface of the ½ spherical shape 9.

An edible filling is then added to the interior of the ½ spherical shape 9. The edible filling can be ice cream, frozen yoghurt, a creme filling, chocolate or other dessert. The ice cream can have one flavor or multiple flavors. Exemplary flavors include, but are not limited to, vanilla, strawberry, chocolate, pineapple and cheesecake. In certain embodiments, the edible filling may include candy, e.g. chocolate chips and/or M&Ms and/or fragments of fruit.

Figure 8:
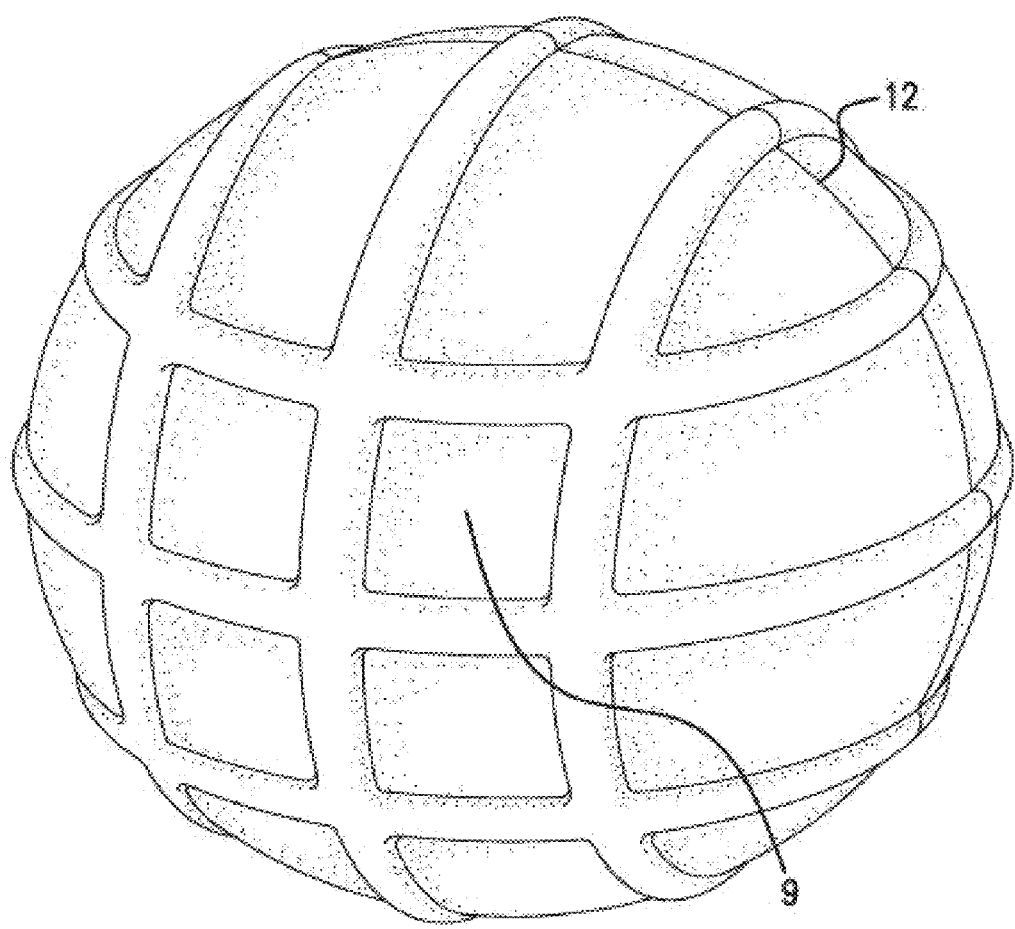
FIG. 8 shows an exemplary perspective view of a bite-size sugar cone sphere.
Figure 9:
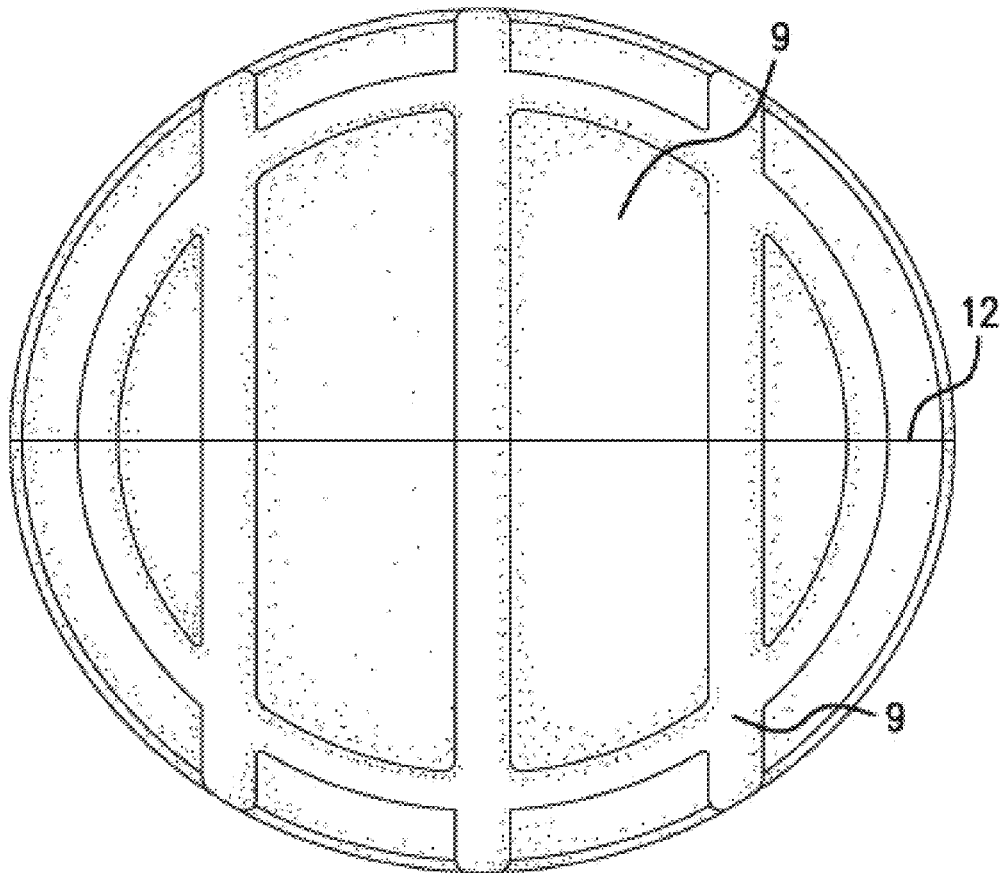
FIG. 9 shows an exemplary top view of the bite-size sugar cone sphere of FIG. 8.

As shown in FIGS. 8-9, two ½ spherical shapes 9 filled with the edible filling, such as ice cream, are joined together at their midline 12 and flash frozen to produce a bite-size sugar cone sphere.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for producing a bite-size edible treat enclosed within a wafer shell, the method comprising:
   baking a wafer dough mix on a heated waffle iron to produce a wafer;
   shaping the wafer into a shape by placing the wafer between an outer mold and an inner half mold and pressing the outer mold against the inner mold, wherein a diameter of the shape is in a range from approximately 0.5 inches to approximately 2 inches;
   cutting the wafer, using a cutter, at a perimeter of the shape to produce a half-molded wafer shell,
      wherein the cutter comprises an outer shell and an inner shell,
      wherein the outer shell of the cutter comprises a first bottom, an inwardly sloped spacer, and a first top,
      wherein the inner shell of the cutter comprises a second top and a second bottom,
      wherein a diameter of the inner shell is approximately a diameter of the half-molded wafer shell, and
      wherein a diameter of the outer shell is between about 0.1-0.3 inches greater than a diameter of the inner shell;
   adding an edible filling to a cavity of the half-molded wafer shell;
   adding another edible filling to a cavity of another half-molded wafer shell;
   joining a perimeter of the half-molded wafer shell and a perimeter of the other half-molded wafer shell; and
   freezing the half-molded wafer shell and the other half-molded wafer shell together to produce a bite-size edible treat.

2. The method of claim 1, further comprising:
   placing a sugar cone connector at an interface between the half-molded wafer shell and the other half-molded wafer shell.

3. The method of claim 1, wherein the edible filling and/or the other edible filing comprises a frozen dessert selected from the group consisting of ice cream and frozen yoghurt.

4. The method of claim 3, wherein the frozen dessert further comprises chocolate chips.

5. The method of claim 1, further comprising:
   coating an interior and/or an exterior surface of the half-molded wafer shell and/or the other half-molded wafer shell with chocolate.

6. The method of claim 3, wherein the frozen dessert has a single flavor.

7. The method of claim 3, wherein the frozen dessert has two or more different flavors.

8. The method of claim 3, wherein the frozen dessert comprises fragments of fruit.

9. The method of claim 1, wherein the outer mold and the inner mold together form a spherical shape.

10. The method of claim 1, wherein the wafer has a pattern on its exterior surface.

11. A method for producing a bite-size ice cream sugar cone sphere, the method comprising:
    baking a wafer dough mix on a heated waffle iron to produce a wafer;
    shaping the wafer into a shape by placing the wafer between an outer mold and an inner mold and pressing the outer mold against the inner mold, wherein a diameter of the shape is in a range from approximately 0.5 inches to approximately 2 inches, and wherein the outer mold and the inner mold together form a spherical shape;
    cutting, using a cutter, the wafer at a perimeter of the shape to produce a half-molded wafer shell,
       wherein the cutter comprises an outer shell and an inner shell,
       wherein the outer shell of the cutter comprises a first bottom, an inwardly sloped spacer, and a first top,
       wherein the inner shell of the cutter comprises a second top and a second bottom,
       wherein a diameter of the inner shell is approximately a diameter of the half-molded wafer shell, and
       wherein a diameter of the outer shell is between about 0.1-0.3 inches greater than a diameter of the inner shell;
    filling a cavity of the half-molded wafer shell with ice cream;
    filling a cavity of another half-molded wafer shell with the ice cream;
    joining a perimeter of the half-molded wafer shell and a perimeter of the other half-molded wafer shell;
    freezing the half-molded wafer shell and the other half-molded wafer shell together to produce the bite-size ice cream sugar cone product.

12. The method of claim 11, further comprising:
    placing a sugar cone connector at an interface between the half-molded wafer shell and the other half-molded wafer shell.

13. The method of claim 11, further comprising:
    coating an interior and/or an exterior of the half-molded wafer shell and/or the other half-molded wafer shell with chocolate.

14. The method of claim 11, wherein the ice cream consists of a single flavor.

15. The method of claim 11, wherein the ice cream comprises two or more different flavors.

16. The method of claim 11, wherein the ice cream comprises candy.

17. The method of claim 16, wherein the candy comprises chocolate chips.

18. The method of claim 11, wherein the ice cream comprises fragments of fruit.

* * * * *